Jan. 26, 1943. C. FARROW 2,309,343

DEFECT DETECTING AND REMOVING APPARATUS

Filed May 15, 1940 4 Sheets-Sheet 1

INVENTOR.
CECIL FARROW
BY
Richey & Watts
ATTORNEYS

Jan. 26, 1943.  C. FARROW  2,309,343
DEFECT DETECTING AND REMOVING APPARATUS
Filed May 15, 1940  4 Sheets-Sheet 2

INVENTOR.
CECIL FARROW
BY Richey & Watts
ATTORNEYS

Jan. 26, 1943. C. FARROW 2,309,343
DEFECT DETECTING AND REMOVING APPARATUS
Filed May 15, 1940 4 Sheets-Sheet 4

INVENTOR.
CECIL FARROW
BY Richey Watts
ATTORNEYS.

Patented Jan. 26, 1943

2,309,343

UNITED STATES PATENT OFFICE 2,309,343

DEFECT DETECTING AND REMOVING APPARATUS

Cecil Farrow, Bainbridge Township, Geauga County, Ohio, assignor to Republic Steel Corporation, Cleveland, Ohio, a corporation of New Jersey Application May 15, 1940, Serial No. 335,290

20 Claims. (Cl. 29—33)

This invention relates to the art of manufacturing electric welded pipe or tubing and more particularly to apparatus for automatically removing from a continuously moving length of tubing such portions thereof as have not been satisfactorily welded or as have defects therein.

In the usual present practice of manufacturing electric welded pipe or tubing, the terms being used interchangeably herein, strip metal is continuously and progressively formed into a tubular blank having opposed seam edges and these edges are subsequently progressively welded together. The welded tubing then passes through finishing operations, including burr removing or planishing, sizing and straightening, and is thereafter severed into desired lengths.

In some prior practices the welded tube was examined for defects after having been cut into pieces of the desired length. When defects of an objectionable magnitude were found, the length of tubing containing one or more of such defects was either scrapped or cut into pieces to eliminate the defects. This procedure had the obvious disadvantage that it required added operations, and pieces of the desired length, but containing defects, were converted into pieces which were shorter than desired. In other words, pieces of many different lengths resulted from such an operation.

According to the present invention, the extra operations of inspecting pieces of tubing and removing defects therefrom are avoided and, furthermore, the total scrap loss and the number of pieces of defect-free tubing of odd lengths can be greatly reduced.

The objects of the present invention are directed to means by which welded tubing can be inspected for defects and defective portions removed therefrom while the tubing is moving. The defects which can be detected and removed by the present invention include: unwelded parts of the seam, which may result when the welding current is turned off and the tube continues to move through the welder; partially or improperly welded seams, which may result from lack of sufficient current, pressure or temperature, or combinations thereof, in the welder; and defects outside of the weld, such as cracks, seams and the like, which may result from manufacturing operations prior to welding of the tube.

Apparatus embodying the present invention broadly includes a welding device for welding the longitudinal seam of a continuously moving tubular blank, a cut-off mechanism arranged to sever the tubing into pieces of the desired lengths, and means for detecting defective portions of the tube in advance of the cut-off mechanism and for actuating the cut-off to remove the defective portions of the tubing when the same reach the cut-off mechanism.

The foregoing and other objects of the invention, and the invention itself, will become more apparent from the following detailed description of certain embodiments thereof taken in conjunction with the accompanying drawings, wherein—

Figure 1:
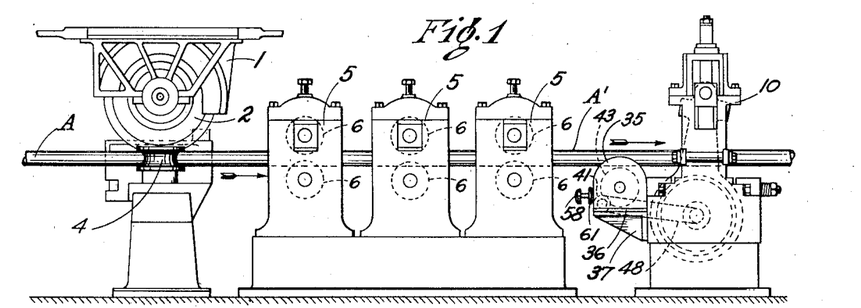
Figure 1 is a fragmentary side elevation of tube making apparatus including the defect detecting and removing apparatus of the present invention.
Figure 2:
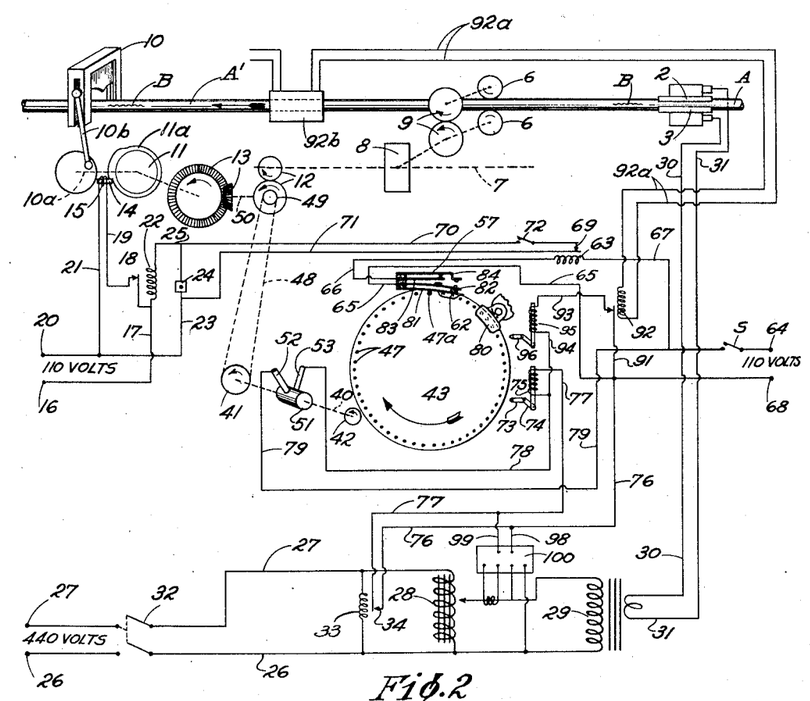
Figure 2 is a wiring diagram and schematic illustration of apparatus embodying the mechanisms shown in Figure 1.

With reference to Figures 1 and 2 of the drawings, the numeral 1 indicates a welding device which may be of any suitable design capable of continuously welding the abutting seam edges of a tubular blank A. As shown, the welding device 1 includes a welding throat comprising electrodes 2 and 3 and pressure rolls 4. From the welding machine the welded tubing A' passes through a plurality of roll stands 5 wherein the tubing is straightened and sized or shaped to predetermined dimensions. The pairs of rolls 6 carried in the stands 5 may be driven by a longitudinally extending drive shaft 7 (see Fig. 2) through gear reducing units and drive gearing indicated at 8 and 9, respectively. For purposes of simplicity, only one pair of straightening rolls and their associated driving mechanism is indicated in Figure 2.

After the welded tubing leaves the last of the roll stands 5 it travels to a cut-off mechanism generally indicated by the numeral 10 which may be of any suitable construction. However, I prefer to employ a single revolution clutch operated device similar to that shown in United States patent to Karl W. Hallden, No. 1,836,712, which includes (see Fig. 2) a roller clutch 11 driven by the main drive shaft 7 through spur gears 12 and beveled gears 13. The clutch 11 is so designed that it is normally maintained inoperative or disengaged by a solenoid actuated plunger 14 which is movable to control the ring 11ᵃ to permit the clutch to engage and actuate the cut-off through shaft 10ᵃ and crank arm 10ᵇ when the solenoid 15 is energized. This solenoid 15 is momentarily energized, in a manner later explained, to effect the withdrawal of the plunger 14 from the notch in ring 11ᵃ. The ring 11ᵃ and clutch 11 make a single revolution and are prevented from further rotation by the return of the plunger 14 into the position of Figure 2 by suitable spring means, or the like, not shown.

The circuit of the solenoid 15 is as follows: alternating current flows from one side 16 of a source of power supply through conductor 17, across relay contacts 18, through conductor 19, to the windings of solenoid 15, and from the solenoid 15 to the other side 20 of the supply line through a conductor 21. The contacts 18 are operatively controlled by the relay winding 22, the circuit of which is from the line 20, through conductor 23, flag or trip switch 24, conductor 25, to the winding 22 of the relay, and from the relay through conductor 17 to line at 16.

The flag switch or trip 24 preferably is positioned in the line of travel of the advancing welded tubing A' and, when actuated by engagement of a tube end, closes the relay circuit energizing solenoid coil 22 which in turn closes the contacts 18, completing the circuit to the clutch operating solenoid 15 which then acts to withdraw the plunger 14, permitting the clutch 11 to engage and operate cut-off mechanism 10 through one stroke to sever tubing A'.

The circuit to the electrodes 2 and 3 of the welding machine is from a suitable source of current through conductors 26 and 27, auto-transformer 28, welding transformer 29 and conductors 30 and 31 to the brushes which engage the rotating electrodes. A switch 32 is placed in the conductor 27 for manually controlling the flow of welding current to the electrodes 2 and 3.

The foregoing structure constitutes a conventional arrangement of tube welding apparatus in which strip metal is continuously formed, welded, and finally severed into desired lengths.

To carry out the objects of this invention I provide, in combination with the foregoing apparatus, a mechanism to actuate the cut-off independently of the usual flag switch, which mechanism is set when a defect occurs in the welding throat or is subsequently detected at some other point, and then actuates the cut-off, when the defective portion of the tubing has reached it, to remove such defective portion or to sever the tubing behind such defective portion.

Any suitable mechanism may be employed in the combination to actuate the cut-off after the tube has moved into the cut-off mechanism from the point at which the defect is detected, but I prefer to use the novel controlling mechanism which is illustrated in Figures 3, 4, 5, 6 and 7 of the drawings, and is indicated generally by the numeral 35 in Figure 1.

Figure 4:
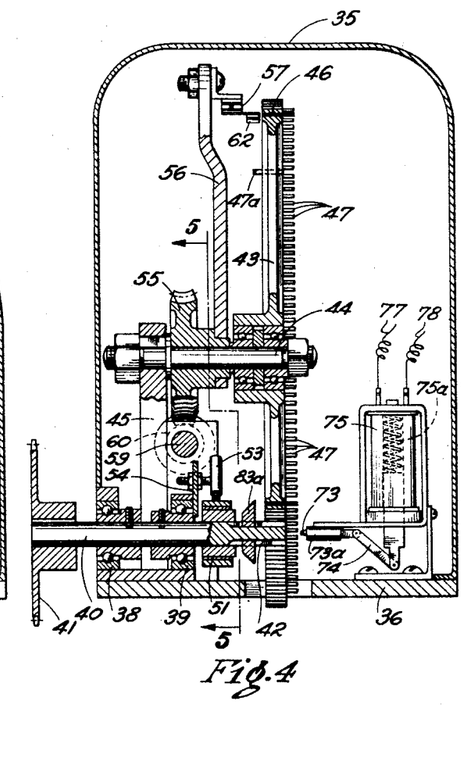
Figure 4 is a vertical cross-sectional view taken on the line 4—4 of Figure 3.

The control mechanism 35 is supported on a base 36 carried on bracket 37 (see Fig. 1) secured to the housing of the cut-off mechanism 10. Mounted on the base 36 are a pair of spaced bearings 38 and 39 in which is journalled a shaft 40 having a sprocket 41 keyed to its outer free end. The other end of the shaft 40 is formed with gear teeth 42 engaging with teeth formed on the periphery of a gear wheel 43 which is rotatably mounted on a shaft 44 supported in a bracket member 45 extending upwardly from the base 36. The wheel 43 is provided with a plurality of transverse holes 46 adjacent its periphery in each of which a pin 47 is mounted for limited sliding movement. In normal position all of the pins project from the right side of the wheel 43 as seen in Figure 4, and in their displaced position extend to the left of the wheel.

The wheel 43 is continuously rotated by shaft 7, so that the rotation of the wheel 43 has a fixed relation to the movement of the tube through the apparatus. The connection between shaft 7 and pin wheel 43 is effected by the gears 12 and a chain 48 (see Fig. 2) connecting a sprocket 49, mounted on the shaft 50, with the sprocket 41 on the shaft 40. Sprockets 41 and 49 are chosen with the proper ratio so that gear wheel 43 will rotate through about two-thirds to three-fourths of a revolution while a point on the welded tubing A' is moving from the welder 1 to the cut-off mechanism 10.

Secured to shaft 40 between the bearing 39 and the gear teeth 42 is a commutator 51 engaged by brushes 52 and 53 adjustably carried in a support 54 secured to the bearing block 39. Rotatably mounted on the shaft 44 is a worm gear 55 carrying an upwardly extending arm 56 the free end of which supports a switch 57 adjacent the periphery of the wheel 43. The switch 57 has a cam shoe 62 positioned out of the path of travel of the pins 47 when the same are in their normal position (extending to the right as seen in Fig. 4), but arranged to be engaged by any of the pins which have been moved laterally of the wheel into their displaced position 47ᵃ.

Suitable mechanism is provided for engaging the pins 47 and pushing the same through the wheel 43 so that they project from the left side thereof (as seen at 47ᵃ in Fig. 4) in the path of the cam shoe 62 on the switch 57. This mechanism is actuated by the device for detecting defects in the tube or weld and is positioned adjacent to the periphery of the wheel 43 at a point spaced sufficiently far from the switch 57 so that the rotation of the wheel 43 from the pin pushing mechanism to the switch 57 will correspond with the movement of the defect in the tube from the point at which it was detected to the cut-off mechanism.

Figures 5, 8, 9:
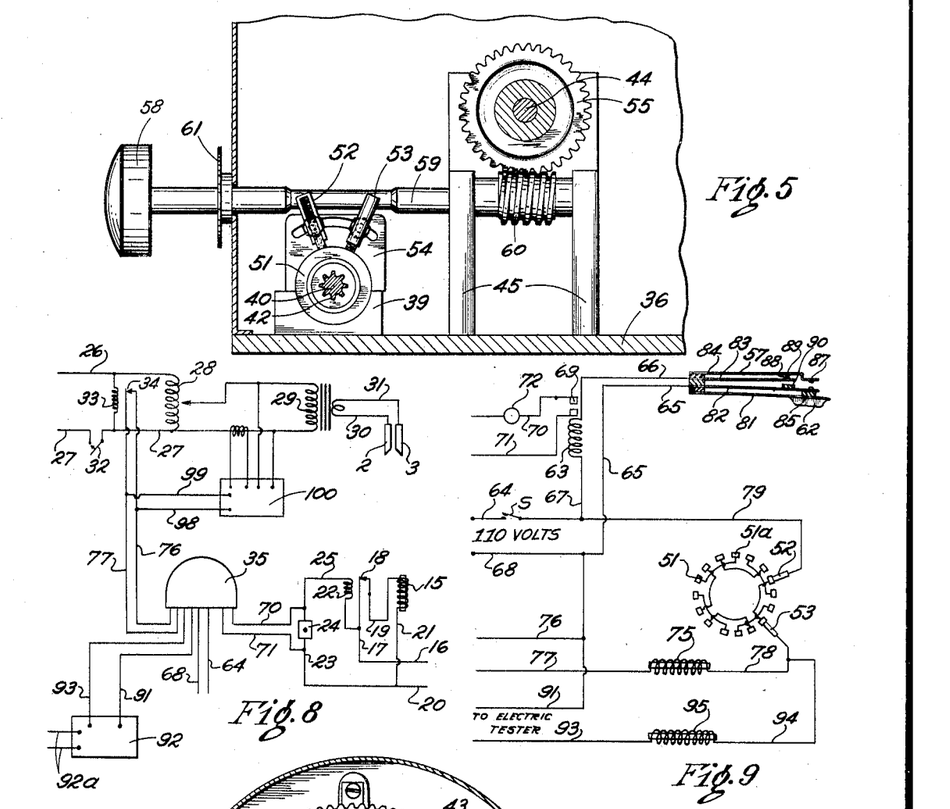
Figure 5 is a fragmentary vertical cross-sectional view taken on the line 5—5 of Figure 4.
Figure 8 is a partial wiring diagram showing the main welding power supply, defect detecting means, and cut-off control connections.
Figure 9 is a partial wiring diagram of apparatus embodying the present invention, and showing the commutator for insuring that the pin hammer operates only when in alignment with a pin.

I have shown a ram or hammer 73 supported on the base 36 of the control mechanism 35 and arranged to be actuated upon the opening or closing of welding circuit or a variation in the welding current. The hammer 73 is slidably mounted in a guide 73ª arranged parallel with the axis of the pins 47 and is connected by a link 74 to the plunger of a solenoid 75. The spring 75ª normally presses the plunger of the solenoid 75 in the direction to maintain the hammer 73 retracted from the pins 47. For detecting defects caused by the opening and closing of the welding circuit the conductors 77 and 78 connected to the windings of the solenoid 75 are connected to a source of current through the commutator 51, brushes 52 and 53 and contact points 34 of a relay 33 which is shunted across the high tension side of the welding circuit or similarly arranged so as to close the circuit to the solenoid 75 when the welding current is interrupted. This circuit, as shown in Figures 2, 8 and 9, is from one side 64 of the current supply through switch S, conductor 79, brush 52 and the commutator 51 to brush 53. The brush 53 is connected to the conductor 78 which leads to solenoid 75 and the circuit from the other side of the solenoid 75 through the conductor 77 to the relay contact points 34 and thence through the conductor 76 to the other side 68 of the current supply.

The commutator 51 is provided with a plurality of contact bars 51ª which are connected in pairs. The brushes 52 and 53 are spaced apart through the same angular distance as the connected bars of each pair so that when the commutator is turned to align two connected bars with the brushes 52 and 53 a circuit is completed between the brushes. The connected pairs of bars 51ª are spaced angularly about the commutator as determined by the gear ratio between the shaft 40 on which the commutator is mounted and the gear wheel 43 and by the desired spacing of the pins 47 on the wheel 43, so that a pair of connected bars are in contact with the brushes 52 and 53 when each pin 47 is in alignment with the hammer 73 and the circuit between the brushes 52 and 53 is broken when the pins 47 are not in alignment with the hammer 73. This spacing is also sufficient to permit the spring 75ª to return the hammer 73 to its retracted position in the interval between the alignment of successive pins 47 with the hammer 73.

It will be apparent that if the welding current is interrupted the contacts 34 of the relay 33 will close and as soon as one of the pins 47 is in alignment with the hammer 73 the solenoid 75 will be energized to move the hammer 73 to the left, as seen in Figure 4 and push the aligned pin 47 to the left hand side of the wheel 43. The rotation of the commutator will then break the circuit and the spring 75ª will retract the hammer 73. When the next pin 47 moves into alignment with the hammer 73 the circuit is again made by the commutator and the solenoid 75 again energized to project the next pin through the wheel. This operation continues so long as the contact points 34 of the relay 33 remain closed, each successive pin 47 being projected to the left hand side of the wheel 43 as it is moved into alignment with the hammer 73.

The pin actuated switch 57 is arranged to control the relay 22 independently of the flag switch 24 so as to actuate the cut-off mechanism 10 at any time determined by the control mechanism 35.

To this end, the switch 57 controls a circuit through a relay solenoid 63 (see Fig. 2). This circuit is from supply line 68, conductor 65, switch 57, conductor 66, relay solenoid 63, conductor 67, to supply line 64. The relay solenoid 63, when energized, closes contacts 69 between conductors 70 and 71 which by-passes the circuit to relay solenoid 22 around the flag switch 24. A switch 72 in conductor 70 may be manually opened if desired to break the circuit to relay 22 through the contacts 69.

Figure 10:
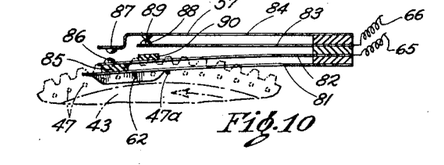
Figures 10, 11 and 12 are enlarged detail views of the switch mechanism employed in the circuit of the cut-off device of Figure 2, the corresponding positions of the pin wheel being shown in phantom lines.
Figure 11:
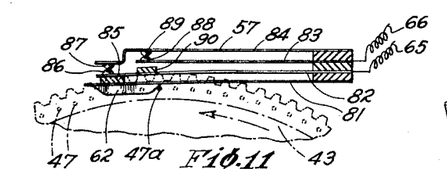
Figure 12:
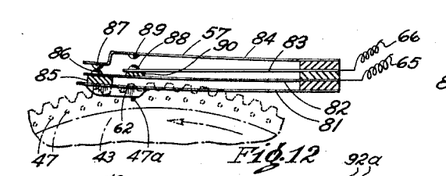

The switch 57 is arranged when moved in one direction to momentarily close the circuit between conductors 65 and 66 and then re-open it, and during the return movement to its original position to again momentarily close the circuit and re-open it. As shown in Figures 10, 11 and 12, the switch consists of four leaf springs 81, 82, 83 and 84, insulated from each other and secured together at one end in spaced generally parallel relationship. Bottom leaf 81 carries the cam shoe 62 and abuts a block of insulating material 85 carried by the free end of leaf 82. A contact point 86 is mounted on leaf 82 opposite the block 85 and is aligned with a contact point 87 on leaf 84, which is bent down and around the end of leaf 83. Aligned contacts 88 and 89 are carried by the leaves 83 and 84 respectively. A block 90 of insulating material prevents contact between leaves 82 and 83.

The conductors 65 and 66 are connected to the leaves 82 and 83, respectively. It will be apparent that the two sets of contact points are in series so that the circuit is made between the conductors 65 and 66 only when both sets of points are closed.

In normal position, the leaves are tensioned so that the points 88 and 89, on the leaves 83 and 84, are in contact, and the points 86 and 87, on the leaves 81 and 84, are spaced apart as shown in Figure 10. When one of the pins 47 which has been projected from the wheel 43 engages the cam shoe 62, the leaves 81 and 82 are pressed upwardly, first bringing the points 86 and 87 into contact, as shown in Figure 11, and thereby completing the circuit from wire 65 through leaf 82, points 86 and 87, leaf 84, points 88 and 89, and leaf 83 to wire 66. The pin 47ª continues to move the leaf 81 upwardly, forcing leaf 84 upwardly until contact points 88 and 89 are separated as shown in Figure 12, thereby again breaking the circuit. The switch remains in the position shown in Figure 12 with the circuit open, until all of the successive pins 47 which have been projected have moved past the cam shoe 62. As the last pin of a series leaves the shoe 62 the leaves return to the normal position shown in Figure 10, passing through the position shown in Figure 11, so that the circuit to the relay 63 is again momentarily closed and then re-opened.

As previously stated, the pin pushing hammer 73 is located a sufficient angular distance from the switch 57 about the periphery of the wheel 43 so that a section of pipe which was located in the welding throat at the time the welding current was interrupted and the contacts 34 closed is just entering the cut-off mechanism 10 when the first pin projected by the hammer 73 is reaching the switch 57. In order to obtain an exact adjustment of the angular relation between the pin pushing hammer 73 and the switch 57 the arm 56 carrying the switch 57 may be adjusted angularly about the shaft 44 by rotation of the worm 60 engaging the worm gear 55 to which the arm 56 is connected. To facilitate this adjustment, the worm 60 in the illustrated embodiment is secured upon a shaft 59 which projects from the housing of the control mechanism and carries a hand knob 58 and a dial 61.

Figures 3, 6:
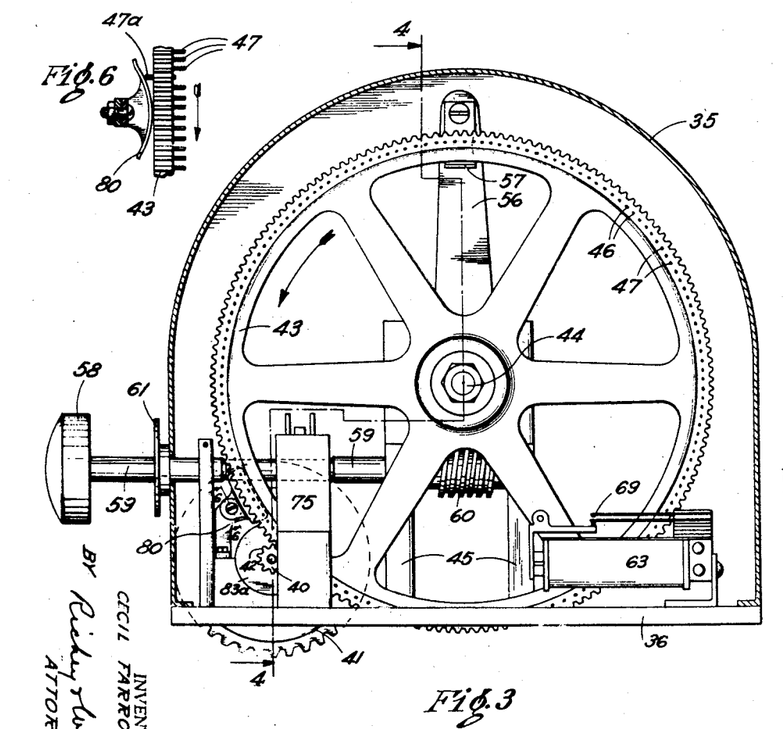
Figure 3 is a detached side elevational view of apparatus made in accordance with this invention for controlling the actuation of the cut-off mechanism.
Figure 6 is an enlarged cross-sectional view taken on line 6—6 of Figure 3.

A disc 83ª is preferably mounted on the shaft 40 so that one side of the disc is in alignment with the hammer 73 to prevent any possibility of the hammer 73 projecting the pins 47 completely through the wheel or jamming the ends in the wheel 43. The rotation of the wheel 43 in the illustrated embodiment is in the direction of the arrow shown in Figure 3. At any suitable point beyond the switch 57 in the direction of travel of the wheel 43 a cam 80 (see Figs. 3 and 6) is mounted on the frame in position to engage any of the pins 47 which have been projected to the left of the wheel as seen in Figure 4 and return them to their normal positions extending to the right of the wheel 43. As shown in Figure 3, the cam 80 may be conveniently mounted adjacent the solenoid 75.

The solenoid 75 is shown so disposed and connected in Figure 2 as to set the pins 47 into switch engaging position when the welding current is interrupted. My invention also contemplates controlling the solenoid 75 when desired so as to set the pins 47 into switch engaging position upon any excessive variation in the amperage or voltage of the welding current or any desired combination thereof. Such a control is particularly desirable in the manufacture of high quality tubing or the like where it is desired to avoid such unsatisfactorily welded portions as may be caused by the interruption of the welding current, or any imperfections in the weld which may be caused by variations in the amperage or voltage of the welding current. For this purpose I have illustrated in the diagrams in Figures 2 and 8 a control panel 100 including a watt-meter or other suitable mechanism (not shown) which may be provided with suitable relays connected to the conductors 98 and 99 to close the circuit between the conductors 76 and 77 under certain current conditions which would result in an unsatisfactory weld.

Figure 7:
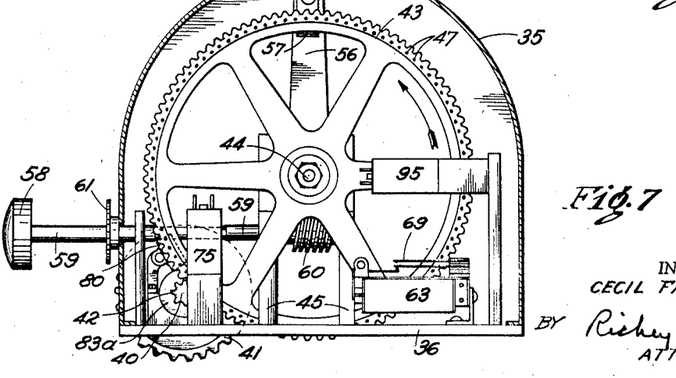
Figure 7 is a side elevation of apparatus generally similar to that illustrated in Figure 3 for controlling the actuation of the cut-off mechanism, but having two separate control means.

In Figure 7 and in the diagrams of Figures 2 and 9 I have illustrated the manner in which a second solenoid for setting the pins 47 may be embodied in the control unit 35 to be actuated by a defect detector 92ᵇ located between the welder 1 and the cut-off mechanism 10. For example, a testing device of the type shown in United States Patent No. 2,065,379 to Horace C. Kneer et al., may be mounted in any convenient position between the welder 1 and the cut-off mechanism 10 and connected to a relay 92 by conductors 92ª (Fig. 2). This relay will be actuated to close when a defect in the tube passes the testing device. The circuit controlled by the action of the testing device may be connected to the relay 92 as shown in Figure 2. The contacts of the relay 92 are arranged to close a circuit between conductor 91 connected to one side 68 of the supply line and the conductor 93 connected to one side of the windings 95 of a pin setting solenoid which controls a hammer 96 and is similar to the solenoid 75 and hammer 73. The other side of the winding 95 is connected through conductor 94 to the conductor 78, the commutator 51 and through the conductor 79 to the other side 64 of the supply line. To control both the solenoid 75 and solenoid 95 through the same commutator 51 it is only necessary to position the solenoid 95 on the circumference of wheel 43 so that its hammer 96 is in a line with one of the pins 47 when the hammer 73 is also in line with another of the pins 47. The angular spacing of the solenoids 75 and 95 about the wheel 43 will, of course, vary with the distance between the welder 1 and the location of the electrical testing device 92ᵇ. Reference is made to the aforesaid Patent No. 2,065,379 for a complete disclosure of the testing device and the manner in which the same may operate a relay 92 to provide current to operate the contacts thereof.

Operation of the cut-off through relay 33 in the welding transformer primary supply line through control panel 100, operating upon fluctuations in welding voltage or current and through a testing device such as disclosed in United States Patent No. 2,065,379, operating through relay 92, have all been included in the wiring diagram of Figure 2 for purposes of illustrating various means which may be used to operate the apparatus. In actual practice, relay 33 is used alone or not at all as either panel 100 or the testing device operating relay 92 would respond to shutting off of the power or to the unwelded seam produced thereby. So, it will be seen that relay 33 is used alone where a simple apparatus is desired to cut out only those portions of the tube which pass through the welding device 1, while the welding power is off. Likewise, either one of the remaining control means, panel 100 or relay 92 with its associated testing device, may be used alone.

In the operation of the apparatus of Figure 2 a tubular blank passes continuously through the welding throat of the welding machine 1 where the abutting seam edges thereof are welded together. The welded tubing then moves through the stands of sizing rolls 6 into the cut-off mechanism 10 where the end thereof is adapted to engage the flag switch 24 controlling the operation of the cut-off mechanism 10 to sever the tubing into desired lengths.

When switch 32 is opened and the flow of current to the electrodes 2 and 3 is interrupted, relay 33 is de-energized and contacts 34, which are normally held open by relay 33, are closed. This closes the circuit to the solenoid 75. Similarly the circuit to the solenoid 75 may be closed due to any variation in the voltage or current which will actuate a device to close the circuit through the control panel 100. Energizing the solenoid 75 is effective to cause the hammer 73 to strike one of the pins 47 and move it to the left side of the gear 43 (see Fig. 4). Commutator 51 which is rotating with shaft 40 acts to keep the circuit through solenoid 75 open except when one of the pins 47 is in line with hammer 73. As long as the circuit to solenoid 75 is closed and drive shaft 7 is rotating and moving tubing A', hammer 73 is caused to strike each successive pin 47 which comes in line with it as gear wheel 43 rotates.

Since hammer 73 has been striking pins 47 while an unwelded portion B was being produced there is corresponding to such portion B a group of pins which have been moved to the left side of gear wheel 43, as shown in Figure 4. This group of displaced pins are carried around by the rotation of gear wheel 43 until they engage shoe 62 associated with switch 57.

Worm gear 55, arm 56 and switch 57 having been previously adjusted so that, as the first of the group is displaced pins 47 representing a non-welded portion B engage cam shoe 62 of switch 57, the portion of the tubing corresponding to this group of displacing pins will be just approaching the cut-off mechanism 10. Switch 57 is closed when engaged by the first of the group of pins 47 and immediately thereafter is opened.

During the time that switch 57 is closed relay 63 is energized which closes contacts 69 and closes the circuit to relay 22 which in turn closes contacts 18 and completes the circuit through solenoid 15. The cut-off mechanism 10 is thereby operated to cut tubing A'. As the same set of displaced pins 47 leave switch 57 its contacts act in reverse order so that relay 63 is again momentarily energized to cause cut-off mechanism 10 to make another cut through tubing A', immediately after the non-welded portion B has passed through the cut-off mechanism.

The device 35 functions in a similar manner to control actuation of the cut-off mechanism when pins 47 are displaced by the solenoid actuated hammer 96, the circuit to which is controlled by the relay 92 of an electrical testing device and thus both unwelded portions of the tube and portions containing other defects will be automatically cut out.

In some cases it is desirable to prevent the cut-off 10 from cutting into a defect. Also, it is impossible with some cut-off machines to cut a piece of less than approximately three feet in length. In the latter case, if a cut is to be made both in advance of and behind a short defect, say of six inches in length, a piece three feet long must be scrapped. To avoid this, it is desirable to make only one cut, so that the defect is left on one end of a piece of tubing where it may be more conveniently removed. Since the length of the piece of tubing, preceding a defect, is controlled by the location of the defect, this piece will usually be a short length. Normally, by leaving the advancing end of the following piece free from a defect, the following piece may be cut full length. Because of this, when only one cut can be made, it is desirable that this cut be made after the defect so as to leave the defect on the trailing end of the previous piece.

Figure 13:
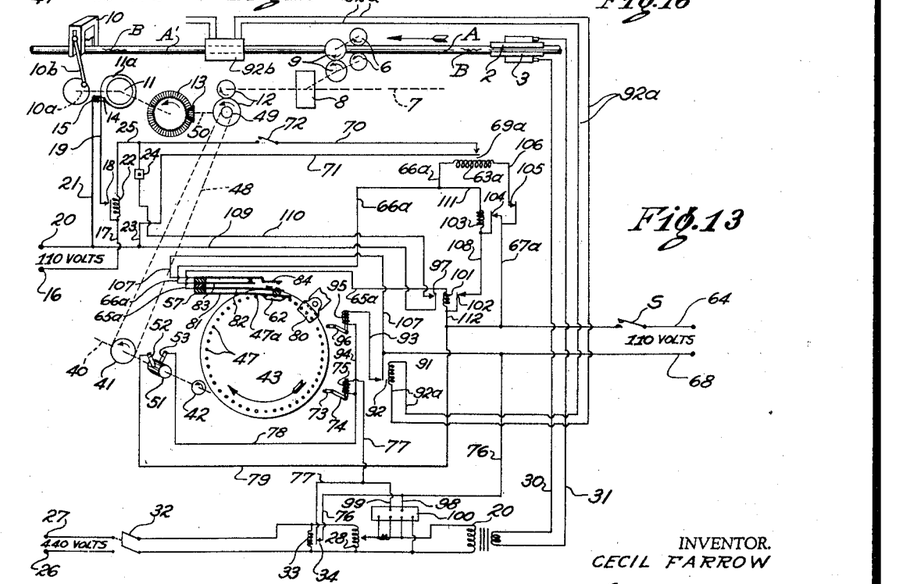
Figure 13 illustrates a modified arrangement of apparatus and operating circuits whereby a tube may be severed so as to leave a defect on the trailing end of a piece of tubing.

The method of connecting switch 57, shown in Figure 13, accomplishes both things listed in the paragraph above as desirable. That is, it renders the cut-off 10 inoperative while a defect is passing through, and it also operates to cause the cut-off 10 to make one cut after a defect has passed through.

In Figures 13 to 16, top leaf 84 of switch 57 is connected through conductor 107 to one side 68 of the 110 volt supply line. Leaf 83 is connected through conductor 66ª to relay 63ª and also through conductor 111 to relay 103. The circuit from relay 63ª is completed through conductor 106 to normally closed contacts 105 of relay 103 and thence through conductor 67ª to the other side 64 of the 110 volt supply. The circuit of relay 103 is completed through normally closed contacts 102 of relay 101 and conductor 112 to other side 64 of the 110 volt supply. Leaf 82 of switch 57 is connected through conductor 65ª to relay 101, the other side of which is connected through conductor 112 to the other side 64 of the 110 volt supply. One side of paddle switch 24 is connected to one side 20 of a 110 volt supply through conductor 110, normally closed contacts 97 of relay 101 and conductor 109. The other side of paddle or flag switch 24 is connected in a manner previously explained for Figure 2, i. e. through relay 22 to side 16 of the 110 volt supply.

Figure 14:
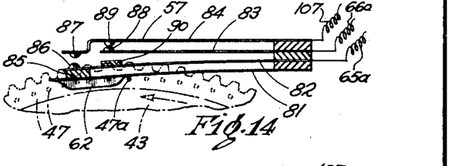
Figures 14, 15 and 16 are views similar to Figures 10, 11 and 12, but illustrating the switch employed with the apparatus of Figure 13.

The operation of the circuit as shown in Figure 13 is as follows:

In the normal position of the cam switch 57, as shown in Figure 14, relay 103 is energized through the following circuit: from one side 68 of a 110 volt supply line through conductor 107 to leaf 84 of cam switch 57, thence through contacts 88 and 89 to leaf 83, thence through conductors 66ª and 111 to the relay 103 and from the other side of relay 103 through conductor 108, normally closed contacts 102 of relay 101 and thence by conductor 112 to the other side 64 of the 110 volt supply. Relay 63ª is not energized because normally closed contacts 105 of relay 103 are held open. Relay 101 is not energized because contacts 86 and 87 of cam switch 57 are open.

Figure 15:
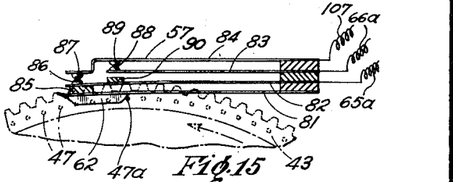

When a pin 47 moves cam switch 57, as previously explained, into the position shown in Figure 15, relay 101 is energized through line 64, conductor 112, conductor 65ª, leaf 82, contacts 86 and 87, leaf 84, and conductor 107 to line 68. Operation of relay 101 opens contacts 97 which disconnects paddle switch 24 so that the cut-off 10 can not be operated by the paddle switch 24 as long as relay 101 is energized. Operation of relay 101 also opens contacts 102. Relay 103 remains energized from the 110 volt line 64—68 through conductor 67ª and contacts 104 on one side and through conductors 111 and 66ª, leaf 83, contacts 88 and 89, leaf 84 and conductor 107, on the other side. This maintains normally closed contacts 105 in an open position so that relay 63ª is not energized, so contacts 69ª are still open, thus preventing the cut-off 10 from operating on the first movement of switch 57.

Figure 16:
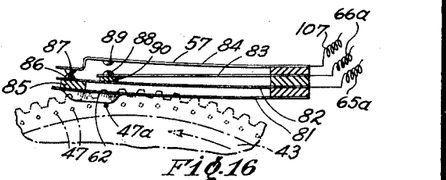

In the next position of cam switch as shown in Figure 16, contacts 86 and 87 remain closed and contacts 88 and 89 open. Relay 101 remains energized. Relay 103 is de-energized and relay 63ª remains not energized. In this condition contacts 97, 102, 104 and 69ª are open and contacts 105 are closed.

As the defective portion of the tube clears the cut-off 10 the cam switch 57 again passes through the position shown in Figure 15, as previously explained. Relay 101 remains energized because contacts 86 and 87 remain closed. Because relay 101 remains energized, normally closed contacts 102 remain open, disconnecting one side of relay 103 from the 110 volt supply lead 64. Therefore relay 103 remains not energized, and normally closed contacts 105 remain closed. In this position of cam switch 57 contacts 88 and 89 are closed so that relay 63ª is now energized through the following circuit: from one side 68 of the 110 volt supply line through conductor 107, leaf 84, contacts 88 and 89, leaf 83, conductor 66ª to relay 63ª, and from the other side of relay 63ª through conductor 106 contacts 105, and conductor 67ª, to the other side 64 of the 110 volt supply line. Energizing relay 63ª closes normally open contacts 69ª which operate through conductors 70 and 71 to by-pass paddle switch 24 to operate the cut-off 10 as previously explained.

Finally, cam switch 57 is returned to the position shown in Figure 14, with contacts 86 and 87 open and contacts 88 and 89 closed. In this position the circuit through the coil of relay 101 is broken by opening contacts 86 and 87 and relay 101 is deenergized. This allows normally closed contacts 97 to close, reconnecting flag switch 24. It also allows normally closed contacts 102 to close, completing the circuit through the coil of relay 103 as explained previously for the normal position of cam switch 37. Energizing relay 103 causes normally closed contacts 105 to be opened thus opening the circuit of relay 63a and allowing normally open contacts 69a to open again. This completes the process of restoring the circuit to its normal position of waiting for the next defect with flag switch 24 restored to control of the cut-off.

Although several forms of my invention have been described in considerable detail it will be understood that variations and modifications may be made in the connections and arrangement of parts without departing from the spirit and scope of my invention. The described apparatus is designed particularly for use with electric tube welding machines, but it will be understood that my improved defect detecting and removing mechanism can be employed in connection with the production of tubing by other methods and also is readily adaptable for removing defects from moving metallic sheet or strip material. I do not, therefore, wish to be limited to the specific forms herein illustrated and described, but claim all embodiments thereof coming within the scope of the appended claims.

I claim:

1. In apparatus including mechanism for moving a metal article in the direction of its length, a cut-off mechanism for severing the moving article and apparatus for detecting defects in the article in advance of the cut-off mechanism, means controlled by said defect detecting apparatus to actuate the cut-off mechanism to sever the article when a detected defect in the article reaches the cut-off mechanism, said means including a member movable in predetermined relation to the movement of said article.

2. In apparatus including a welder for continuously welding the longitudinal seam of tubing, a cut-off mechanism for severing the welded tubing and apparatus for detecting defects in the weld of the tubing in advance of the cut-off mechanism, means controlled by said defect detecting apparatus to actuate the cut-off mechanism to sever the tubing at each end of a detected defective weld portion as the same passes through the cut-off mechanism, said means including a member movable in predetermined relation to the movement of said tubing.

3. In apparatus including an electric tube welder having an electrical circuit for supplying welding current to endwise moving tubing and a cut-off mechanism for severing the welded tubing, means responsive to the opening and the closing of the welding circuit for controlling the actuation of the cut-off mechanism for severing the tubing which passes through the welder when the welding circuit is open, said means including a movable member, and means for moving said member in synchronism with the movement of said tubing.

4. In apparatus including mechanism for moving a metal article in the direction of its length, a cut-off mechanism for severing the metal article and a testing device for detecting defects in said article, means, controlled by said testing device, for actuating the cut-off mechanism to remove from the moving article a detected defective portion thereof when the same reaches the cut-off mechanism, said means including a movable member and means for moving it in synchronism with the movement of the said article.

5. In apparatus including a welder for continuously welding the longitudinal seam of endwise moving tubing and a cut-off mechanism for severing the welded tubing, means responsive to variations in the flow of welding current to said welder for actuating the cut-off mechanism to sever the tubing at a predetermined time after a current variation occurs, said means including a member rotatable in synchronism with the travel of said tubing and means acting thru said rotatable member for actuating said cut-off mechanism.

6. In apparatus including a welder for welding the longitudinal seam of endwise moving tubing and means for severing the welded tubing, control means for controlling said severing means to sever defect containing weld portions from the tubing, said control means including a rotatable member, mechanism to rotate it in synchronism with the movement of said tubing, and apparatus acting thru said rotatable member for actuating said severing means.

7. In apparatus including means for moving an elongated metal article in the direction of its length, means for severing the metal article and means for detecting defects in the article, control means controlled by said defect detecting means for controlling the operation of said severing means, said control means including a movable member, apparatus for moving it in synchronism with the movement of said article, an electric switch, and devices carried by said movable member for actuating said switch.

8. In apparatus including an electrical welder for welding the longitudinal seam of endwise moving metal tubing, a current supply circuit for said welder and mechanism for severing the welded tubing, means for actuating said severing mechanism to remove portions of the tubing which pass through the welder during periods when no welding current flows in said welder circuit, the said means including a rotatable member, means to rotate it in synchronism with the movement of said tubing, an electrical circuit between said rotatable member and said severing means, and means carried by said rotatable member for opening and closing said circuit.

9. In apparatus including a welder for welding the longitudinal seam of tubing, and means responsive to the opening and closing of the welding circuit for removing defect containing portions from the tubing caused by said opening and closing of the welding circuit, said means including a member movable in synchronism with the movement of said tubing and electrical means actuated by said member for permitting actuation of said defect removing means.

10. In apparatus including a welder for welding the longitudinal seam of endwise moving tubing, a cut-off mechanism for severing the welded tubing, and means for detecting defects in the tubing in advance of the cut-off mechanism, a rotatable wheel, a plurality of pins spaced around the periphery of said wheel, pin pushing means responsive to said defect detecting means for laterally displacing said pins, and means, controlled by said pins, for controlling the operation of the cut-off mechanism to sever the tubing when a detected defect in the tubing reaches the cut-off mechanism.

11. In apparatus including an electric welder for welding the longitudinal seam of endwise moving tubing, and a cut-off mechanism for severing the welded tubing, a rotatable wheel, a plurality of pins spaced around the periphery of said wheel, means, controlled by variations in the flow of current to said welder, for moving said pins, and means, controlled by said pins, for actuating the cut-off mechanism to sever the tubing when portions of the tube which pass through the welder during such variations in welding current reach said cut-off mechanism.

12. In apparatus including a welder for continuously welding the longitudinal seam of endwise moving tubing, a cut-off mechanism for severing the welded tubing, and means for detecting defects in the tubing in advance of the cut-off mechanism, a rotatable wheel, laterally displaceable pins carried by said wheel, means responsive to said defect detecting means for displacing said pins, and means engageable by such displaced pins for controlling the actuation of the cut-off mechanism to sever the tubing at each end of a detected defect in the tubing.

13. In apparatus including means for moving an elongated metal article lengthwise, a cut-off mechanism for severing the article, and means for detecting defects in the article in advance of the cut-off mechanism, a member movable in predetermined relation to the endwise movement of the article, displaceable means carried by said member, means for moving said displaceable means in response to said defect detecting means, and means controlled by said displaceable means to actuate the cut-off mechanism to sever the article when a detected defect in the article reaches the cut-off mechanism.

14. In apparatus including a welder for continuously welding the longitudinal seam of tubing, a cut-off mechanism for severing the welded tubing and means for detecting defects in the tubing in advance of the cut-off mechanism, means for actuating said cut-off mechanism including a wheel rotatable in predetermined relation to movement of the tubing through the welder, displaceable pins mounted on said wheel, means actuated by said detecting means for actuating said displaceable means, and means engageable by said pins for controlling the actuation of the cut-off mechanism to sever tubing at each end of a detected defect when such detected defect in the tubing reaches the cut-off mechanism.

15. In apparatus of the type described including means for moving an elongated metal article in the direction of its length and means for severing the article while moving, means for controlling the operation of said severing means including defect detecting means disposed in advance of said severing means, a rotatable member movable in synchronism with the article movement, a plurality of movable switch operating members carried by said rotatable member, a switch positioned to be actuated by said switch operating members when said switch operating members are in one position, means responsive to said defect detecting means for moving said switch operating members into said one position, means for returning said switch operating members to their other position, and electrical connections from said switch to said article severing means, said means for moving said switch operating members being circumferentially spaced around said rotatable member ahead of said switch whereby said switch will be actuated to control the article severing means to cut the article after the detected defect has passed the severing means.

16. In apparatus of the type described including means for moving an elongated metal article in the direction of its length and means for severing the tube while moving, means for controlling the operation of said severing means including defect detecting means disposed in advance of said severing means, a rotatable member movable in synchronism with the article movement, a plurality of movable switch operating members carried by said rotatable member, a switch positioned to be actuated by said switch operating members when said switch operating members are in one position, means responsive to said defect detecting means for moving said switch operating members into said one position, means for returning said switch operating members to their other position, and electrical connections from said switch to said article severing means, said means for moving said switch operating members being circumferentially spaced around said rotatable member ahead of said switch whereby said switch will be actuated to control the article severing means to cut the article before the detected defect has passed the severing means.

17. In apparatus of the type described including means for moving a metal tube in the direction of its length and means for severing the tube while moving, means for controlling the operation of said severing means including defect detecting means disposed in advance of said severing means, a rotatable member movable in synchronism with the tube movement, a plurality of movable switch operating members carried by said rotatable member, a switch positioned to be actuated by said switch operating members when said switch operating members are in one position, means responsive to said defect detecting means for moving said switch operating members into said one position, means for returning said switch operating members to their other position, and electrical connections from said switch to said tube severing means, said means for moving said switch operating members being circumferentially spaced around said rotatable member ahead of said switch whereby said switch will be actuated to control the tube severing means to cut the tube before and after the detected defect has passed the severing means.

18. In apparatus of the type described including means for moving a metal tube in the direction of its length and means for severing the tube while moving, means for controlling the operation of said severing means including defect detecting means disposed in advance of said severing means, a rotatable member movable in synchronism with the tube movement, a plurality of movable switch operating members carried by said rotatable member, a switch positioned to be actuated by said switch operating members when said switch operating members are in one position, means responsive to said defect detecting means for moving said switch operating members into said one position, means for returning said switch operating members to their other position, electrical connections from said switch to said tube severing means, said means for moving said switch operating members being circumferentially spaced around said rotatable member ahead of said switch whereby said switch will be actuated to control the tube severing means to cut the tube after the detected defect has passed the severing means, and means for holding the electrical connections from said switch to said severing means open while a defect is passing through said severing means.

19. In apparatus including tube severing means and means for actuating said severing means, control means for said severing means comprising a rotatable wheel, a switch disposed adjacent said wheel, a plurality of movable switch engaging members arranged circumferentially around said wheel, said members having switch engaging and switch clearing positions, means, positioned adjacent said wheel and circumferentially displaced from said switch, for moving said members into switch engaging position, means positioned beyond said switch and ahead of said means for moving said members into switch engaging position for returning said member to switch clearing position, and electrical connections from said switch to said means for actuating said severing means.

20. In apparatus including mechanism for moving a metal article in the direction of its length, a cut-off mechanism for severing the moving article and apparatus for detecting defects in the article in advance of the cut-off mechanism, means controlling actuation of the cut-off mechanism, said control means including a member movable in predetermined relation relative to the movement of the article and means actuated by said defect detecting apparatus and acting thru said movable member for controlling actuation of the cut-off mechanism to sever the article at a place predetermined with respect to a detected defect in the article.

CECIL FARROW.